US007726796B2

(12) United States Patent
Takahashi et al.

(10) Patent No.: US 7,726,796 B2
(45) Date of Patent: Jun. 1, 2010

(54) MAGNETIC WIRE APPLICATION APPARATUS, METHOD THEREOF AND PRINTED MATERIAL INCLUDING MAGNETIC WIRE

(75) Inventors: Kunihiro Takahashi, Kanagawa (JP); Mario Fuse, Kanagawa (JP); Shoji Yamaguchi, Kanagawa (JP); Tetsuya Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1133 days.

(21) Appl. No.: 11/175,198

(22) Filed: Jul. 7, 2005

(65) Prior Publication Data

US 2006/0209147 A1 Sep. 21, 2006

(30) Foreign Application Priority Data

Mar. 17, 2005 (JP) ............................. 2005-077223

(51) Int. Cl.
*B41J 2/175* (2006.01)
*B41J 2/01* (2006.01)
*G01D 11/00* (2006.01)

(52) U.S. Cl. ............................ 347/88; 347/99; 347/103

(58) Field of Classification Search ................... 347/88, 347/99, 107, 103, 21
See application file for complete search history.

(56) References Cited

U.S. PATENT DOCUMENTS

| | | | | |
|---|---|---|---|---|
| 3,052,564 | A * | 9/1962 | Kulesza | 427/550 |
| 4,812,632 | A * | 3/1989 | Kakinuma et al. | 235/479 |
| 5,471,233 | A * | 11/1995 | Okamoto et al. | 347/103 |
| 5,896,087 | A * | 4/1999 | Frowein | 340/572.1 |
| 6,020,399 | A * | 2/2000 | Matzinger | 523/160 |
| 6,196,674 | B1 * | 3/2001 | Takemoto | 347/103 |
| 6,324,353 | B1 * | 11/2001 | Laussermair et al. | 399/16 |
| 6,354,207 | B1 * | 3/2002 | Maekawa et al. | 101/453 |
| 6,402,317 | B2 * | 6/2002 | Yanagawa et al. | 347/104 |
| 6,547,151 | B1 * | 4/2003 | Baldi | 235/492 |
| 6,585,364 | B2 * | 7/2003 | Kasperchik et al. | 347/98 |
| 6,640,717 | B2 * | 11/2003 | Kosaka et al. | 101/487 |
| 6,652,075 | B2 * | 11/2003 | Jacobson | 347/55 |
| 6,854,821 | B2 * | 2/2005 | Ericson et al. | 347/14 |
| 7,114,804 | B2 * | 10/2006 | Nunokawa | 347/104 |
| 7,283,150 | B2 * | 10/2007 | Sharma et al. | 347/240 |
| 7,301,324 | B2 | 11/2007 | Yamaguchi et al. | 324/76.11 |
| 2003/0189610 | A1 * | 10/2003 | Darby et al. | 347/19 |
| 2006/0038013 | A1 * | 2/2006 | Yamaguchi et al. | 235/449 |

FOREIGN PATENT DOCUMENTS

| | | | | |
|---|---|---|---|---|
| DE | 3921590 | C1 * | 5/1990 | |
| EP | 0 836 148 | A2 | 4/1998 | |

(Continued)

*Primary Examiner*—Stephen D Meier
*Assistant Examiner*—Leonard S Liang
(74) *Attorney, Agent, or Firm*—Morgan Lewis & Bockius LLP

(57) ABSTRACT

A magnetic wire application apparatus includes: an image forming unit that forms an image on a drum using a solid ink; a magnetic wire application unit that applies a magnetic wire on the image formed on the drum by the image forming unit using the solid ink; and an image transfer unit that transfers the image, which is formed by the image forming unit on the drum by the solid ink and applied with the magnetic wire by the magnetic wire application unit, to a printing paper.

11 Claims, 8 Drawing Sheets

FOREIGN PATENT DOCUMENTS

| | | | | |
|---|---|---|---|---|
| FR | 2593305 | A1 | * | 7/1987 |
| JP | 53042032 | A | * | 4/1978 |
| JP | 57069063 | A | * | 4/1982 |
| JP | 61160260 | A | * | 7/1986 |
| JP | 01051960 | A | * | 2/1989 |
| JP | 02145341 | A | * | 6/1990 |
| JP | 06099682 | A | * | 4/1994 |
| JP | 08199498 | A | * | 8/1996 |
| JP | 08-311800 | | | 11/1996 |
| JP | 09305732 | A | * | 11/1997 |
| JP | 11-172172 | | | 6/1999 |
| JP | 2000-155485 | | | 6/2000 |
| JP | 2002-317398 | | | 10/2002 |
| JP | 2005146477 | A | * | 6/2005 |
| WO | WO 0234542 | A1 | * | 5/2002 |

* cited by examiner

MAGNETIC WIRE APPLICATION APPARATUS, METHOD THEREOF AND PRINTED MATERIAL INCLUDING MAGNETIC WIRE

BACKGROUND OF THE INVENTION

1. Field of the Invention

The present invention relates to a magnetic wire application apparatus, a method thereof and a printed material including a magnetic wire, and more particularly to a magnetic wire application apparatus and a method thereof that applies a magnetic wire for security in a desired location as required with respect to printing paper on which the printing of image data is carried out by a printing apparatus that uses solid ink, and a resulting printed material including a magnetic wire.

2. Description of the Related Art

In recent years various methods and apparatuses have been proposed with the object of strengthening security including preventing leakage of confidential information, personal information, and the like, and preventing forgery involving illicit copying of securities and the like.

As techniques with the object of preventing forgery of securities and the like, there is a technique of producing anti-counterfeit paper involving the insertion of a security thread or the like into paper to give the paper a special characteristic for identifying genuine ones.

For example, an anti-counterfeit paper is provided in Japanese Patent Application Laid-open No. 8-311800. This paper is structured having two or more layers and, when the paper is manufactured by a cylinder paper machine, a security thread is inserted between a paper layer positioned at an outermost area and a paper layer positioned hereunder, thereby enabling prevention of counterfeiting by a color copying machine.

And in Japanese Patent Application Laid-open No. 2002-317398, a paper is provided that incorporates a wire for preventing shoplifting in a manner in which the magnetic wire is incorporated between paper layers of the base paper layer.

Furthermore, in recent years there have been image forming apparatuses that use solid inks formed by solidifying a dye-based ink by a wax resin.

For example, in Japanese Patent Application Laid-open No. 11-172172, a phase change ink and a printing method are provided in which an image identical to a silver halide photographic film used in image forming for medical diagnosis is formed using the phase change ink.

Furthermore, in Japanese Patent Application Laid-open No. 2000-155485, a solid ink, a toner fixing method, and a fixing apparatus are provided for an image recording apparatus in which the surface properties and conditions of printed sections can be changed to match surface properties and conditions of the recording medium to be used.

With the techniques of Japanese Patent Application Laid-open No. 8-311800 and Japanese Patent Application Laid-open No. 2002-317398, it is possible to use a cylinder paper machine or a Fourdrinier machine to manufacture a paper by which an anti-counterfeit effect and an anti-removal effect can be obtained. However, with these techniques, it has not been possible to apply a magnetic wire as required to a paper that is already manufactured and is to be used for printing in order to manufacture a security paper by which an anti-counterfeit effect and an anti-removal effect can be obtained.

Furthermore, in Japanese Patent Application Laid-open No. 11-172172 and Japanese Patent Application Laid-open No. 2000-155485, no technique is proposed for applying a magnetic wire as required to a printing paper before or after image data is printed on that printing paper by an image forming apparatus.

SUMMARY OF THE INVENTION

The present invention has been made in view of the above circumstances and provides a magnetic wire application apparatus and a method thereof that applies a magnetic wire for security in a desired location as required with respect to printing paper on which the printing of image data is to be carried out with a printing apparatus that uses a solid ink.

A first aspect of the present invention provides a magnetic wire application apparatus including: an image forming unit that forms an image on a drum using a solid ink; a magnetic wire application unit that applies a magnetic wire on the image formed on the drum by the image forming unit using the solid ink; and an image transfer unit that transfers the image, which is formed by the image forming unit on the drum by the solid ink and applied with the magnetic wire by the magnetic wire application unit, to a printing paper.

According to the first aspect of the present invention, since it includes an image forming unit that forms an image on the drum using the solid ink, a magnetic wire application unit that applies a magnetic wire on the image formed by the image forming unit using the solid ink, and an image transfer unit that transfers the image, which is applied with the magnetic wire by the magnetic wire application unit and formed by the image forming unit on the drum by the solid ink, to the printing paper, it is possible to apply a magnetic wire for security in a desired location as required with respect to printing paper on which the printing of image data is carried out by a printing apparatus that uses solid ink.

Furthermore, it is possible to apply the magnetic wire to the printing paper such that the magnetic wire is embedded between the printing paper and the solid ink with the solid ink covering the magnetic wire, and therefore it is possible to apply the magnetic wire inconspicuously.

Furthermore, an effect is also achieved in that an adhesive agent for adhering the magnetic wire to the printing paper is not required.

BRIEF DESCRIPTION OF THE DRAWINGS

Embodiments of the present invention will be described in detail based on the following figures, wherein.

DETAILED DESCRIPTION OF THE INVENTION

Embodiments of a magnetic wire application apparatus, a method thereof and a printed material including a magnetic wire according to the present invention are described in detail with reference to the accompanying drawings.

Figure 1:
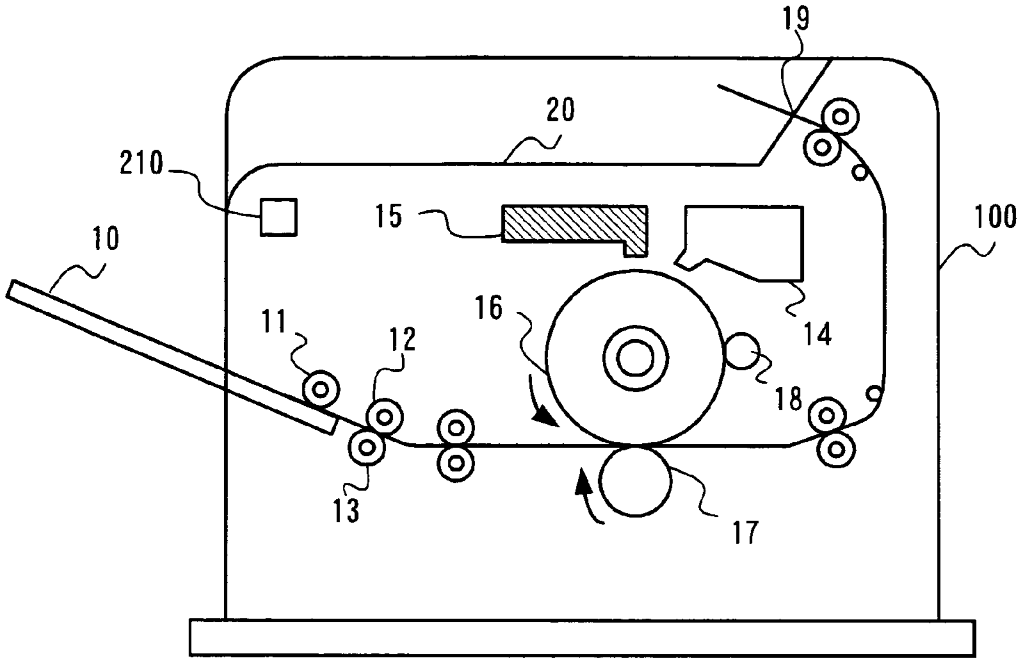
FIG. 1 is a block diagram showing a configuration of principle components of an image forming apparatus 100.

FIG. 1 is a block diagram showing a configuration of principal components of an image forming apparatus 100 to which the magnetic wire application apparatus and a method thereof according to the present invention have been applied.

It should be noted that the image forming apparatus 100 shown in FIG. 1 is configured to apply to paper as required a magnetic wire, which transmits a signal when subjected to a predetermined magnetic field. This is for the purpose of strengthening the security of forgery prevention and the prevention of illicit copying and illicit removal of products and so on. With this apparatus it is possible to prevent illicit copying of a paper on which confidential information has been printed and illicit removal of products by carrying out an anti-copying or anti-removal processing operation by detecting the magnetic wire that has been applied to the paper using a copying machine or an anti-theft apparatus or the like provided with a detection device that detects magnetic wire.

As shown in FIG. 1, the image forming apparatus 100 is configured by a paper supply tray 10, a pickup roller 11, a feed roller 12, a retarding roller 13, an inkjet head 14, a magnetic wire dispensing device 15, a drum 16, a transfer roller 17, a maintenance roller 18, a paper output opening 19, a paper output tray 20, a CPU (central processing unit) 210, and so on.

The pickup roller 11 fulfills a function of drawing out printing paper from the paper supply tray 10. The feed roller 12 and the retarding roller 13 fulfill a function of separating and feeding sheet by sheet the printing paper that has been drawn out. The feed roller 12 rotates in the carrying direction of the printing paper and a torque is applied by the retarding roller 13 in an opposite direction to the carrying direction to return the printing paper, thus preventing the supply of two or more sheets of printing paper.

In this way, printing paper is carried sheet by sheet from the paper supply tray to the transfer roller 17.

Furthermore, the surface of the drum 16 is warmed to approximately 60° C. so that the ink does not bond, and silicone oil is applied by the maintenance roller 18 at the start of printing to improve the peelability of ink from the surface of the drum 16.

When silicone oil is applied, solid ink that is melted to a liquid form is ejected by the inkjet head 14 onto the drum 16 to form an ink image on the drum 16.

Solid ink refers to dye-based inks that harden to a solid wax resin at room temperature.

When an ink image is formed on the drum 16 by the solid ink that has been melted to a liquid state, a magnetic wire is dropped onto the ink image on the drum 16 by the magnetic wire dispensing device 15 and the magnetic wire that has been dropped adheres to the surface of the ink image.

Then, the ink image formed on the drum 16 and the magnetic wire that has adhered to the surface of the ink image are rotated together with the drum 16 and transferred to a printing paper by the transfer roller 17.

The solid ink that is transferred from the drum 16 to the printing paper bonds instantaneously and fixes so as to entwine closely with the fibrous surface of the printing paper.

The magnetic wire that has adhered to the surface of the ink image is bonded to the surface of the printing paper in a state in which the magnetic wire is covered by the solid ink between the solid ink and the printing paper.

In this way, a printing paper to which a magnetic wire has been applied by being bonded between the printing paper and the solid ink is output from the paper output opening 19 to the paper output tray 20.

It should be noted that the magnetic wire applied to the printing paper is a magnetic wire of a wire diameter of approximately 30 μm for example that has a Barkhausen effect and is formed with a Fe—Co based amorphous material.

Since the magnetic wire emits a sharp magnetic pulse when magnetic reversal occurs upon receiving a predetermined magnetic field, it is possible to determine whether or not a magnetic wire has been applied to the printing paper by subjecting the printing paper to the predetermined magnetic field and detecting whether or not a magnetic pulse is detected at that time.

Next, a functional configuration within the CPU 210 that carries out operational control of the image forming apparatus 100 is described with reference to FIG. 2.

Figure 2:
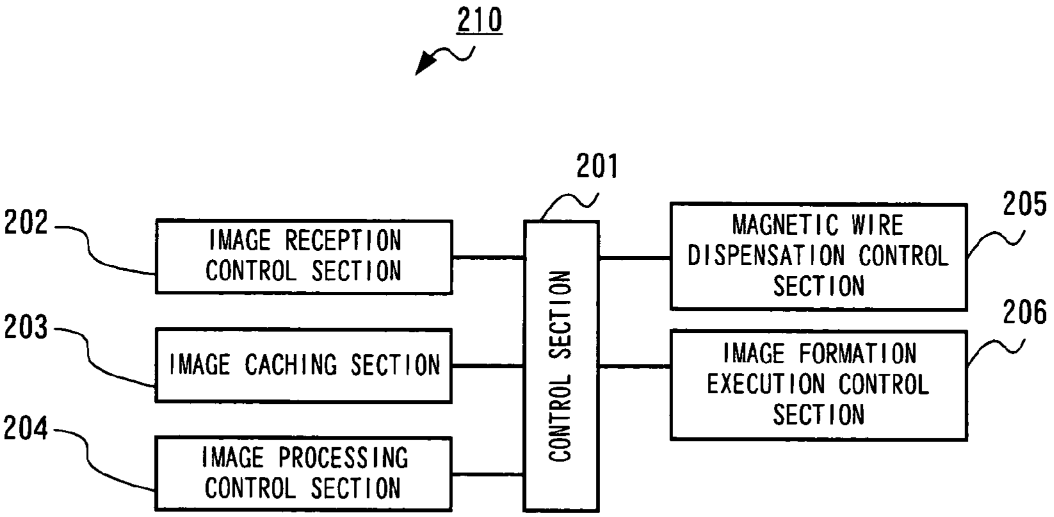
FIG. 2 is a block diagram showing a functional configuration within a CPU 210.

FIG. 2 is a block diagram showing the functional configuration within the CPU 210 that carries out operational control of the image forming apparatus 100.

As shown in FIG. 2, the CPU 210 is configured by a control section 201, an image reception control section 202, an image caching section 203, an image processing control section 204, a magnetic wire dispensation control section 205, and an image formation execution control section 206.

The control section 201 carries out control of each section of the CPU 210 and also provides overall control of the entire image forming apparatus 100.

The image reception control section 202 carries out control of the reception of image data at an image reception section (not shown in the figure) of the image forming apparatus 100. The image caching section 203 caches image data that is received at the image reception section, and the image processing control section 204 controls an image processing section (not shown in the figure) to carry out control such as determining the location in which magnetic wire is to be applied based on image data. The magnetic wire dispensation control section 205 carries out control such that the magnetic wire dispensing device 15 is caused to drop magnetic wire. The image formation execution control section 206 carries out control of an image formation execution section, which includes the inkjet head 14, the drum 16, the transfer roller 17, and the maintenance roller 18, to execute image formation such that an image is formed on the printing paper.

When, under the control of the image reception control section 202, an image reception section (not shown in the figure) of the image forming apparatus 100 receives a print instruction for image data that contains an instruction from a user to apply magnetic wire, the received image data is temporarily cached and stored in the image caching section 203.

When its turn comes for printing, the image data stored in the image caching section 203 is transferred to an image processing section (not shown in the figure) controlled by the image processing control section 204.

The image processing section identifies a solid area of a photo or an illustration or the like within the image data that is transferred, this area being a region that will be inconspicuous even if a magnetic wire is applied, and determines that solid area as a location for the application of a magnetic wire.

Also, if a user is to give the instruction for the location in which magnetic wire is to be applied, the image processing section identifies a location for the application of a magnetic wire within the image data instructed by the user, and determines this as a location for applying a magnetic wire.

When the location in the image data for applying the magnetic wire is determined, the image formation execution control section 206 carries out control of components such as the inkjet head 14, which constitute the image formation execution section, and an ink image is formed by the inkjet head 14 on the drum 16, on which silicone oil has been applied by the maintenance roller 18.

When an ink image is formed on the drum 16 in the location determined by the image processing section for applying a magnetic wire, the magnetic wire dispensation control section 205 carries out control so that the magnetic wire dispensing device 15 is caused to drop a magnetic wire above the ink image that is formed.

When the magnetic wire is dropped by the magnetic wire dispensing device 15 onto the ink image formed on the drum 16, a process is carried out in which an image is formed on a printing paper under the control of the image formation execution control section 206, and the ink image that has been formed on the drum 16 and the magnetic wire are transferred onto the printing paper by the transfer roller 17, such that a printing paper on which a process of applying a magnetic wire and a process of forming an image have been carried out is output from the paper output opening 19 to the paper output tray 20.

Furthermore, when, under the control of the image reception control section 202, an image reception section (not shown in the figure) of the image forming apparatus 100 receives a print instruction for image data that does not contain an instruction from a user to apply magnetic wire, the received image is temporarily cached and stored in the image caching section 203.

When its turn comes for printing, the image data stored in the image caching section 203 undergoes printing without being applied with a magnetic wire by the image formation execution section, which includes components such as the inkjet head 14 and is controlled by the image formation execution control section 206.

In this way, the image forming apparatus 100 applies a magnetic wire to the printing paper along with image data as required by the instruction of the user.

Next, a state in which a magnetic wire has been dropped onto an ink image on the drum 16, and the magnetic wire and the ink are transferred to the printing paper is described with reference to FIG. 3.

Figure 3:
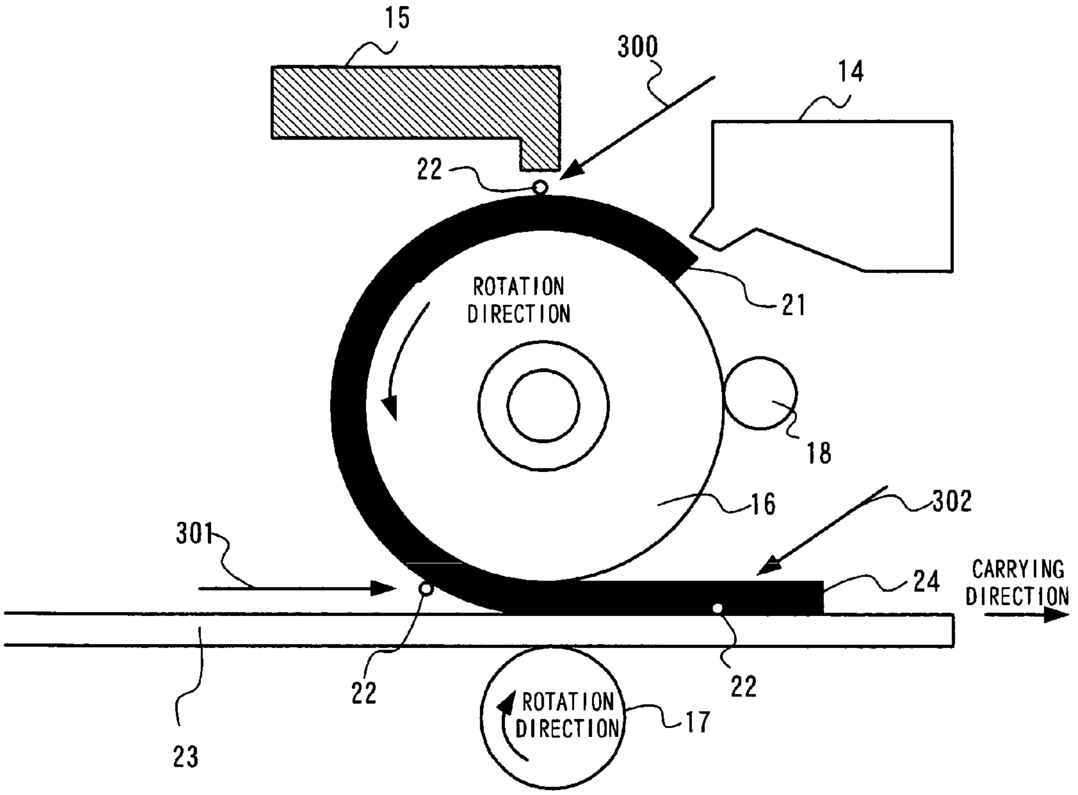
FIG. 3 is a schematic diagram showing a state in which a magnetic wire 22 has been dropped onto an ink image 21 on a drum 16, and the magnetic wire 22 and ink 24 are transferred to a printing paper 23.

FIG. 3 is a schematic diagram showing a state in which a magnetic wire 22 has been dropped onto an ink image 21 on a drum 16, and the magnetic wire 22 and the ink 24 are transferred to a printing paper 23.

As shown in FIG. 3, the ink image 21 is formed on the drum 16 by the ejection of a melted solid ink onto the drum 16 by the inkjet head 14.

The magnetic wire dispensing device 15 drops a magnetic wire 22 (location indicated by an arrow 300) onto the ink image 21 formed on the drum 16 in a location for applying magnetic wire determined by the image processing section.

In this way, the magnetic wire 22 is dropped onto the ink image 21 formed on the drum 16, thus causing a condition (location indicated by the arrow 300) in which the magnetic wire 22 adheres to the surface of the ink image 21.

The magnetic wire 22 rotates with the drum 16 while staying adhered to the surface of the ink image 21 (location indicated by an arrow 301) and is transferred to the printing paper 23 together with the ink image 21 by the transfer roller 17.

The ink that is transferred from the drum 16, whose surface is warmed to approximately 60° C., instantaneously bonds to the printing paper 23 and fixes so as to entwine closely with the fibrous surface of the printing paper 23.

When on the drum 16, the magnetic wire 22 adheres to the surface of the ink layer formed by the ink image 21. However, on the printing paper 23, since the ink image 21 and the magnetic wire 22 are transferred together when transferred to the printing paper 23, the magnetic wire 22 becomes covered (location indicated by an arrow 302) by the ink 24 fixed to the printing paper 23 after being transferred to the printing paper 23.

In this way, the magnetic wire 22 becomes applied to the printing paper 23 by the ink that fixes onto the printing paper 23.

Next, a positional relationship between the ink 24 that has fixed on the printing paper 23 and the magnetic wire 22 is described with reference to FIG. 4.

Figure 4:
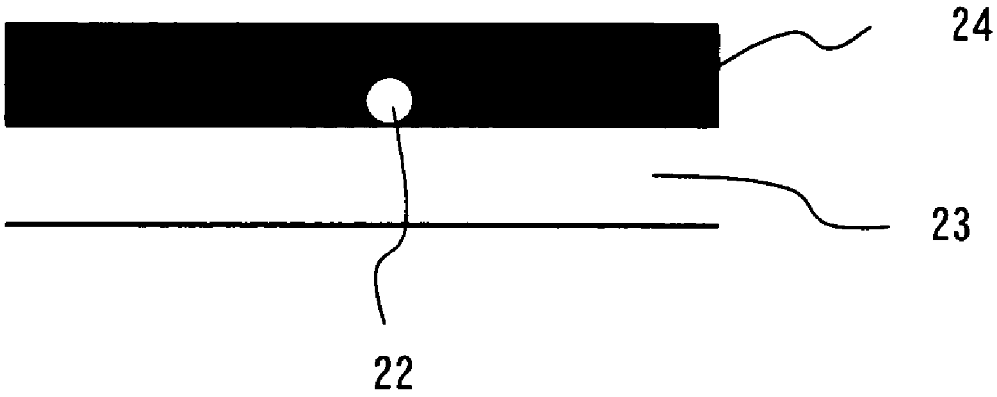
FIG. 4 is a schematic diagram showing a positional relationship between the ink 24 fixed on the printing paper 23 and the magnetic wire 22.

FIG. 4 is a schematic diagram showing a positional relationship between the ink 24 that has fixed on the printing paper 23 and the magnetic wire 22.

As shown in FIG. 4, the positional relationship between the ink 24 that has fixed on the printing paper 23 and the magnetic wire 22 is such that the magnetic wire 22 is on the printing paper 23 and the ink 24 that is fixed onto the printing paper 23 covers the magnetic wire 22.

In this way, the ink 24 that has bonded covers the magnetic wire 22 and the magnetic wire 22 is applied to the printing paper 23.

It should be noted that when the image processing section (not shown in the figure) determines the location for applying the magnetic wire, the image processing section may determine to carry out a process for forming a solid mark in a blank region on the image data to be printed, for example, a location where the number of pages is shown, or a header area, or a footer area, or a place in which a logo is formed, and apply the magnetic wire thereon.

Up to here, description has been given concerning an example of an image forming apparatus 100 configured such that a magnetic wire is applied between a printing paper and a solid ink that forms an image when image data is transferred to the printing paper.

Figure 5:
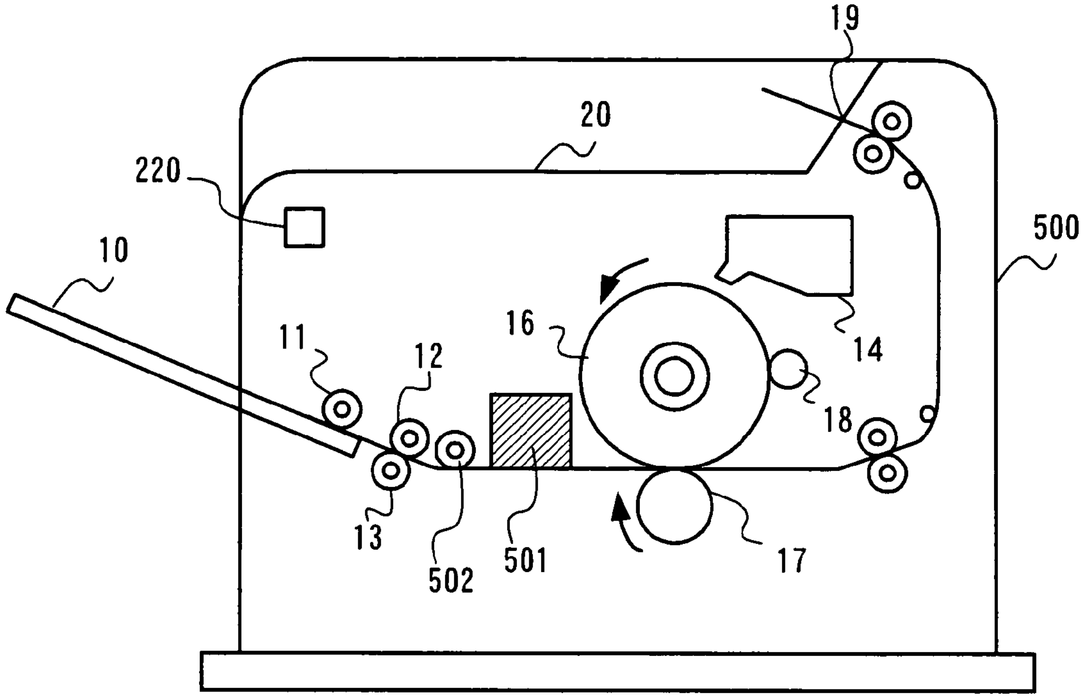
FIG. 5 is a block diagram showing a configuration of principle components of an image forming apparatus 500.

FIG. 5 is a line block diagram showing a configuration of principal components of an image forming apparatus 500, which is one example in which the magnetic wire application apparatus and a method thereof according to the present invention have been applied differently from the image forming apparatus 100.

The image forming apparatus 500 shown in FIG. 5 is configured to apply a magnetic wire to the printing paper in advance prior to the image being transferred to the printing paper.

It should be noted that in FIG. 5 a magnetic wire dispensing device 501 of the image forming apparatus 500 is arranged in a position different from the position in which the magnetic wire dispensing device 15 of the image forming apparatus 100 shown in FIG. 1 was arranged, but otherwise the configuration is the same as the image forming apparatus 100. Thus, to facilitate description, each of the components identical to those in the image forming apparatus 100 will be given the same reference number as for the image forming apparatus 100 and description thereof will be omitted.

As shown in FIG. 5, the image forming apparatus 500 is configured by a paper supply tray 10, a pickup roller 11, a feed roller 12, a retarding roller 13, an inkjet head 14, a drum 16, a transfer roller 17, a maintenance roller 18, a paper output opening 19, a paper output tray 20, a CPU 220, a magnetic wire dispensing device 501, a motor 502, and so on.

The magnetic wire dispensing device 501 carries out a process by which a magnetic wire is applied to the printing paper. A method for applying the magnetic wire to the printing paper may be such that, for example, an adhesive agent applying section and a magnetic wire dispensing section are provided inside the magnetic wire dispensing device 501. After an adhesive agent is applied to the printing paper by the adhesive agent applying section, the magnetic wire is applied by the magnetic wire dispensing section to an area in which the adhesive agent has been applied. And furthermore it may be that only the magnetic wire dispensing section is provided in the magnetic wire dispensing device 501 and the magnetic wire is applied to the printing paper by the magnetic wire dispensing section pasting onto the printing paper a tape to which the magnetic wire has been attached.

The motor 502 is for adjusting the position in which the printing paper is positioned in the magnetic wire dispensing device 501 and adjusts the position in which the magnetic wire is applied to the printing paper.

The CPU 220 carries out operational control of the image forming apparatus 500.

A functional configuration within the CPU 220 is described with reference to FIG. 6.

Figure 6:
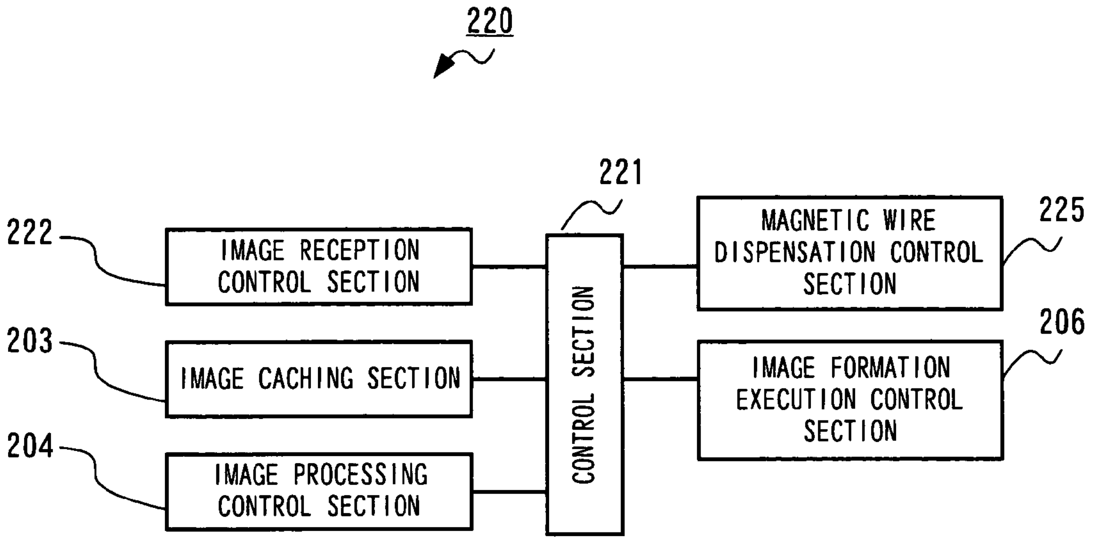
FIG. 6 is a block diagram showing a functional configuration within a CPU 220.

FIG. 6 is a block diagram showing the functional configuration within a CPU 220.

Differences in the configuration of the CPU 220 shown in FIG. 6 compared to the CPU 210 described with reference to FIG. 2 are a control section 221, an image reception control section 222, and a magnetic wire dispensation control section 225, but otherwise each section fulfills the same function as each of the sections of the CPU 210 and is thus given the same reference numeral as in the CPU 210 and description thereof will be omitted to avoid duplication.

The control section 221 carries out control of each structural section of the CPU 220 and also provides overall control of the entire image forming apparatus 500. The image reception control section 222 carries out control of the reception of image data at an image reception section (not shown in the figure) of the image forming apparatus 500. The magnetic wire dispensation control section 225 carries out control such that the magnetic wire dispensing device 501 is caused to apply magnetic wire in a location determined by the image processing control section 204 for application of magnetic wire.

With the image forming apparatus 500, when a print instruction containing an instruction from a user to apply magnetic wire is received at the image reception section (not shown in the figure), the printing paper that has been carried from the paper supply tray 10 is positioned in the magnetic wire dispensing device 501 by the motor 502 and a magnetic wire is applied to the printing paper by the magnetic wire dispensing device 501. Then, printing is carried out using a solid ink by components such as the transfer roller 17, which is an image formation execution section, and a printing paper to which a magnetic wire has been applied and on which printing has been carried out using a solid ink is output to the paper output tray 20.

Furthermore, with the image forming apparatus 500, when a print instruction that does not contain an instruction from a user to apply magnetic wire is received at the image reception section (not shown in the figure), the printing paper that has been carried from the paper supply tray 10 undergoes printing using a solid ink by components such as the transfer roller 17, which is an image formation execution section, and a printing paper on which printing has been carried out using a solid ink is output to the paper output tray 20.

In this way, there is an advantage with the image forming apparatus 500 that, when a magnetic wire is applied and printing is carried out by printing with solid ink after a magnetic wire has been applied as required, the magnetic wire that is applied to the printing paper is covered by the solid ink and is inconspicuous.

It should be noted that when the image processing section (not shown in the figure) determines the location for applying the magnetic wire, the image processing section may carry out a process for forming a solid mark in a blank region on the image data to be printed, for example, a location where the number of pages is to be shown, or a header area, or a footer area, or a place in which a logo is to be formed, and determine a location on the printing paper on which this solid mark is to be printed as the location on the printing paper where a magnetic wire is applied by the magnetic wire dispensing device 501 through the control of the magnetic wire dispensation control section 225.

Figure 7:
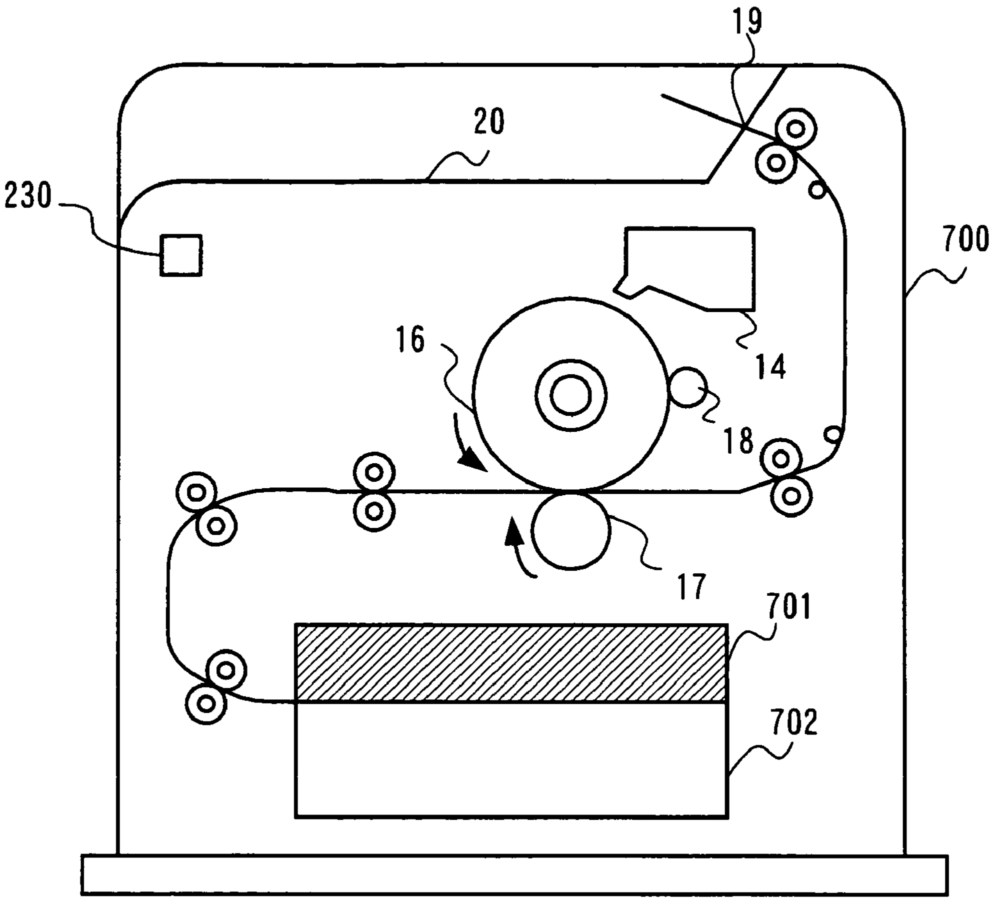
FIG. 7 is a block diagram showing a configuration of principle components of an image forming apparatus 700.

Furthermore, in an image forming apparatus in which a process of applying a magnetic wire to a printing paper and a process of forming an image are carried out, magnetic wire may be applied to printing paper in the paper supply tray as shown in FIG. 7, after which a process may be carried out in which an image is formed on the printing paper on which the magnetic wire has been applied.

FIG. 7 is a line block diagram showing a configuration of principal components of an image forming apparatus 700, which is one example in which the magnetic wire application apparatus and a method thereof according to the present invention have been applied differently from the image forming apparatuses 100 and 500.

The image forming apparatus 700 shown in FIG. 7 is configured to apply a magnetic wire to the printing paper that is accommodated and stored in the paper supply tray.

It should be noted that in FIG. 7, each of the sections that are the same as in the image forming apparatus 500 are assigned the same numbers as for the image forming apparatus 500 and description thereof will be omitted.

As shown in FIG. 7, the image forming apparatus 700 is configured by a paper supply tray 702, an inkjet head 14, a drum 16, a transfer roller 17, a maintenance roller 18, a paper output opening 19, a paper output tray 20, a CPU 230, a magnetic wire dispensing device 701, and so on.

The paper supply tray 702 accommodates printing paper, and the magnetic wire dispensing device 701 carries out an operation in which a magnetic wire is applied to the printing paper accommodated and stored in the paper supply tray 702.

A method for applying magnetic wire to the printing paper with the magnetic wire dispensing device 701 may be such that, for example, an adhesive agent applying section and a magnetic wire dispensing section are provided inside the magnetic wire dispensing device 701 and after an adhesive agent is applied to the printing paper by the adhesive agent applying section, the magnetic wire is applied by the magnetic wire dispensing section to an area in which the adhesive agent has been applied. And furthermore it may be that only the magnetic wire dispensing section is provided in the magnetic wire dispensing device 701 and the magnetic wire is applied to the printing paper by the magnetic wire dispensing section pasting onto the printing paper a tape to which the magnetic wire has been attached.

The CPU 230 carries out operational control of the image forming apparatus 700.

Next, the functional configuration within the CPU 230 is described with reference to FIG. 8.

Figure 8:
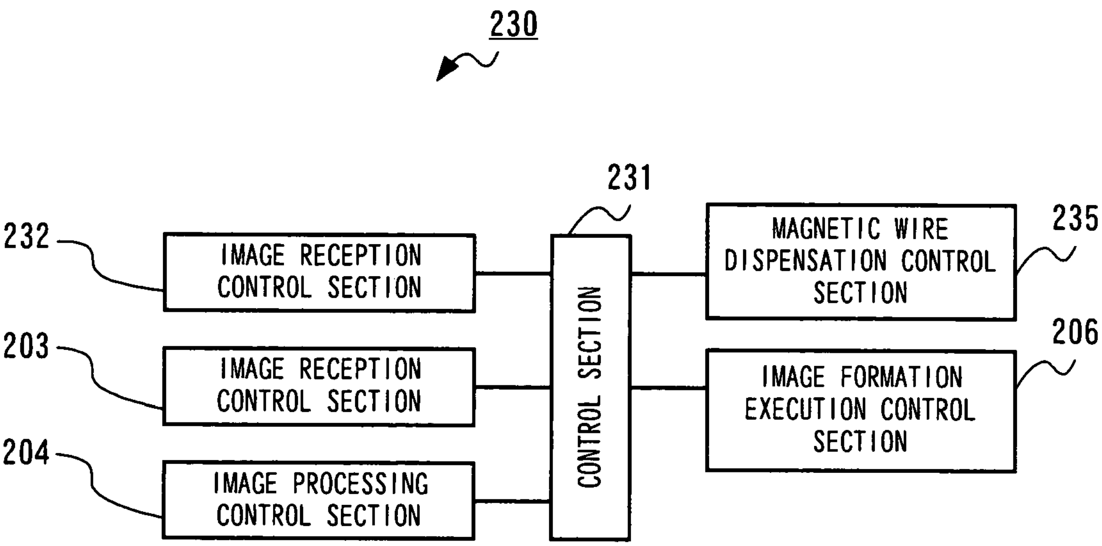
FIG. 8 is a block diagram showing a functional configuration within a CPU 230.

FIG. 8 is a block diagram showing the functional configuration within a CPU 230.

Differences in the configuration of the CPU 230 shown in FIG. 8 compared to the CPU 210 described with reference to FIG. 2 are a control section 231, an image reception control section 232, and a magnetic wire dispensation control section 235, but otherwise each section fulfills the same function as each of the sections of the CPU 210 and is thus given the same reference numeral as in the CPU 210 and description thereof will be omitted to avoid duplication.

The control section 231 carries out control of each section of the CPU 230 and also provides overall control of the entire image forming apparatus 700. The image reception control section 232 carries out control of the reception of image data at an image reception section (not shown in the figure) of the image forming apparatus 700. The magnetic wire dispensation control section 235 carries out control such that the magnetic wire dispensing device 701 is caused to apply magnetic wire in a location determined by the image processing control section 204 for application of magnetic wire.

With the image forming apparatus 700, when a print instruction containing an instruction from a user to apply magnetic wire is received at the image reception section (not shown in the figure), a magnetic wire is applied to the printing paper in the paper supply tray 702. Then, the printing paper to which a magnetic wire has been applied is conveyed to the transfer drum 16 and printing is carried out with solid ink by components such as the transfer roller 17, which is an image formation execution section. The printing paper to which a magnetic wire has been applied and on which printing has been carried out using solid ink is output to the paper output tray 20.

Furthermore, with the image forming apparatus 700, when a print instruction that does not contain an instruction from a user to apply magnetic wire is received at the image reception section (not shown in the figure), no magnetic wire is applied to the printing paper in the paper supply tray 702 and the printing paper is conveyed to the transfer drum 16. Printing is carried out using solid ink by components such as the transfer roller 17, which is an image formation execution section, and the printing paper on which printing has been carried out using solid ink is output to the paper output tray 20.

In this way, there is an advantage with the image forming apparatus 700 that, when a magnetic wire is applied and printing is carried out by printing with solid ink after a magnetic wire has been applied as required, the magnetic wire that is applied to the printing paper is covered by the solid ink and is inconspicuous.

It should be noted that when the image processing section (not shown in the figure) determines the location for applying the magnetic wire, the image processing section may carry out a process for forming a solid mark in a blank region on the image data to be printed, for example, a location where the number of pages is to be shown, or a header area, or a footer area, or a place in which a logo is to be formed, and determine a location on the printing paper on which this solid mark is to be printed as the location for magnetic wire to be applied when the magnetic wire dispensation control section 235 causes the magnetic wire dispensing device 701 to apply a magnetic wire in a location on the printing paper.

As described above, according to a first aspect of the present invention, there is provided a magnetic wire application apparatus which includes: an image forming unit that forms an image on a drum using a solid ink; a magnetic wire application unit that applies a magnetic wire on the image formed on the drum by the image forming unit using the solid ink; and an image transfer unit that transfers the image, which is formed by the image forming unit on the drum by the solid ink and applied with the magnetic wire by the magnetic wire application unit, to a printing paper.

According to a second aspect of the present invention, in the magnetic wire application apparatus in the first aspect of the present invention, the magnetic wire application unit may include an identification unit that identifies a specific location in the image formed on the drum by the solid ink, and wherein the magnetic wire is applied onto the solid ink formed in a specific location which is identified by the identification unit.

According to a third aspect of the present invention, in the magnetic wire application apparatus in the second aspect of the present invention, the identification unit may identify as the specific location a location in which a solid image in the image formed on the drum is formed.

According to a fourth aspect of the present invention, in the magnetic wire application apparatus in the first aspect of the present invention, the image forming unit may form a specific image on the drum using the solid ink in order for the magnetic wire to be applied by the magnetic wire application unit, and the magnetic wire application unit may apply the magnetic wire on the specific image formed by the image forming unit using the solid ink.

According to a fifth aspect of the present invention, a magnetic wire application apparatus includes: an image forming unit that forms an image on a drum using a solid ink; a magnetic wire application unit that applies a magnetic wire on an area of a printing paper, where the image formed on the drum using the solid ink is to be transferred; and an image transfer unit that transfers the image of the solid ink onto the area of the printing paper where the magnetic wire has been applied.

According to a sixth aspect of the present invention, there is provided a method for applying a magnetic wire to a printing paper, which includes: attaching the magnetic wire to the printing paper prior to formation of an image by a solid ink; and subsequently forming the image on the printing paper by the solid ink.

According to a seven aspect of the present invention, there is provided a method for applying a magnetic wire to a printing paper, which includes: forming an image on a drum by a solid ink; applying the magnetic wire onto the image formed on the drum by the solid ink; and transferring the image, which is formed on the drum by the solid ink and applied with the magnetic wire, to a printing paper.

According to an eighth aspect of the present invention, a printed material with a magnetic wire includes: a sheet of printing material; a magnetic wire applied on the sheet; and a layer of a solid ink that covers the magnetic wire and forms a desired image on the sheet, in which the magnetic wire emits a magnetic pulse upon receiving a predetermined magnetic field.

The present invention may be used in an image forming apparatus that uses solid ink.

With this invention, it is possible to apply magnetic wire for security in a desired location as required with respect to printing paper on which the printing of image data is carried out by a printing apparatus that uses solid ink.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-077223 filed on Mar. 17, 2005 including specification, claims, drawings and abstract is incorporated herein by reference in its entirety.

What is claimed is:

1. A magnetic wire application apparatus, comprising:

an image forming unit that forms an image on a drum using a solid ink;

a magnetic wire application unit that applies a magnetic wire on the image formed on the drum by the image forming unit using the solid ink; and an image transfer unit that transfers the image, which is formed by the image forming unit on the drum by the solid ink and applied with the magnetic wire by the magnetic wire application unit, to a printing paper.

2. The magnetic wire application apparatus according to claim 1, wherein the magnetic wire application unit comprises an identification unit that identifies a specific location in the image formed on the drum by the solid ink, and wherein the magnetic wire is applied onto the solid ink formed in a specific location which is identified by the identification unit.

3. The magnetic wire application apparatus according to claim 2, wherein the identification unit identifies as the specific location a location in which a solid image in the image formed on the drum is formed.

4. The magnetic wire application apparatus according to claim 1, wherein the image forming unit forms a specific image on the drum using the solid ink in order for the magnetic wire to be applied by the magnetic wire application unit, and wherein the magnetic wire application unit applies the magnetic wire on the specific image formed by the image forming unit using the solid ink.

5. A magnetic wire application apparatus comprising:

an image forming unit that forms an image on a drum using a solid ink;

a magnetic wire application unit that applies a magnetic wire on an area of a surface of a printing paper, where the image formed on the drum using the solid ink is to be transferred; and an image transfer unit that transfers the image of the solid ink onto the area of the printing paper where the magnetic wire has been applied, wherein the magnetic wire emits a sharp magnetic pulse upon receiving a predetermined magnetic field.

6. The magnetic wire application apparatus according to claim 5, wherein the magnetic wire has a substantially circular cross-section.

7. A method for applying a magnetic wire, comprising:

attaching the magnetic wire to a surface of a printing paper prior to formation of an image by a solid ink; and subsequently forming the image on the printing paper by the solid ink so that the attached magnetic wire is covered by the solid ink, wherein the magnetic wire emits a sharp magnetic pulse upon receiving a predetermined magnetic field.

8. The method for applying a magnetic wire according to claim 7, wherein the magnetic wire has a substantially circular cross-section.

9. A method for applying a magnetic wire, comprising:

forming an image on a drum by a solid ink;

applying the magnetic wire onto the image formed on the drum by the solid ink; and transferring the image, which is formed on the drum by the solid ink and applied with the magnetic wire, to a printing paper.

10. A printing material including a magnetic wire, comprising:

a sheet of printing material;

a magnetic wire applied on a surface of the sheet; and a layer of a solid ink that covers the magnetic wire and forms a desired image on the sheet, wherein the magnetic wire emits a sharp magnetic pulse upon receiving a predetermined magnetic field.

11. The printing material including a magnetic wire according to claim 10, wherein the magnetic wire has a substantially circular cross-section.

* * * * *